(12) United States Patent
Chapin et al.

(10) Patent No.: US 8,941,685 B1
(45) Date of Patent: Jan. 27, 2015

(54) SHOWING GEO-LOCATED INFORMATION IN A 3D GEOGRAPHICAL SPACE

(75) Inventors: Charles Chapin, San Jose, CA (US); Gokul Varadhan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 502 days.

(21) Appl. No.: 13/043,045

(22) Filed: Mar. 8, 2011

(51) Int. Cl.
*G09G 5/00* (2006.01)

(52) U.S. Cl.
USPC .......................................... 345/632; 345/629

(58) Field of Classification Search
USPC .................................................. 345/632, 629
See application file for complete search history.

(56) References Cited

U.S. PATENT DOCUMENTS

| | | | | |
|---|---|---|---|---|
| 5,363,476 | A * | 11/1994 | Kurashige et al. | 345/419 |
| 5,491,517 | A * | 2/1996 | Kreitman et al. | 348/581 |
| 6,036,601 | A | 3/2000 | Heckel | |
| 6,075,542 | A * | 6/2000 | Fredlund et al. | 715/848 |
| 6,208,386 | B1 * | 3/2001 | Wilf et al. | 348/578 |
| 6,292,227 | B1 * | 9/2001 | Wilf et al. | 348/587 |
| 6,587,755 | B1 * | 7/2003 | Smith et al. | 701/1 |
| 6,864,886 | B1 * | 3/2005 | Cavallaro et al. | 345/420 |
| 7,209,807 | B2 * | 4/2007 | Smith et al. | 701/1 |
| 7,451,041 | B2 * | 11/2008 | Laumeyer et al. | 701/420 |
| 7,583,265 | B2 * | 9/2009 | Shiraishi et al. | 345/427 |
| 8,358,317 | B2 * | 1/2013 | Carlson | 345/582 |
| 8,406,992 | B2 * | 3/2013 | Laumeyer et al. | 701/400 |
| 8,416,247 | B2 * | 4/2013 | Zalewski | 345/474 |
| 8,442,328 | B2 * | 5/2013 | Stankiewicz et al. | 382/224 |
| 8,593,453 | B2 * | 11/2013 | Sharp et al. | 345/419 |
| 8,626,584 | B2 * | 1/2014 | van Datta et al. | 705/14.4 |
| 8,700,302 | B2 * | 4/2014 | Khosravy et al. | 701/426 |
| 2003/0046158 | A1 * | 3/2003 | Kratky | 705/14 |
| 2005/0179685 | A1 * | 8/2005 | Kake et al. | 345/419 |
| 2009/0322740 | A1 * | 12/2009 | Carlson | 345/419 |
| 2011/0106595 | A1 * | 5/2011 | Vande Velde | 705/14.4 |

OTHER PUBLICATIONS

Doyle, S., et al., "The Potential of Web-Based Mapping and Virtual Reality Technologies for Modelling Urban Environments," *Computer, Environmental, and Urban Systems*, vol. 22, No. 2, pp. 137-155, Elsevier Science Ltd., Great Britain (1998).

(Continued)

*Primary Examiner* — M Good Johnson
(74) *Attorney, Agent, or Firm* — Lerner, David, Littenberg, Krumholz & Mentlik, LLP (57) ABSTRACT

Methods and systems for providing a graphic, such as an advertisement, in a 3D geographical information system (GIS) view are described. A method for providing a graphic in a 3D GIS view may include obtaining a graphic and determining a 3D geographical space in the GIS view based on a geographical reference in the GIS view. The method may also include rendering and displaying a curvilinear representation of the graphic in the geographical space. The method may further include adjusting the curvilinear representation of the graphic according to an updated viewpoint of the GIS view. The curvilinear representation may be oriented directly towards the updated viewpoint. A system for providing a graphic in a 3D GIS view may include a geographical space manager, a graphic representation generator and a display module.

31 Claims, 10 Drawing Sheets

(56) References Cited

OTHER PUBLICATIONS

Hung, Y., et al., "Augmenting panoramas with object movies by generating novel views with disparity-based view morphing," *The Journal of Visualization and Computer Animation* 13: pp. 237-247, John Wiley & Sons, Ltd. (2002).

Kanade, T., et al., "Virtualized Reality: Constructing Virtual Worlds from Real Scenes," *Immersive Telepresence*, pp. 34-47, IEEE Multimedia (Jan.-Mar. 1997).

Uyttendaele, M., and Hartley, R., "Image-Based Interactive Exploration of Real-World Environments," *IEEE Computer Graphics and Applications*, pp. 52-63, IEEE Computer Society (May/Jun. 2004).

\* cited by examiner

SHOWING GEO-LOCATED INFORMATION IN A 3D GEOGRAPHICAL SPACE

BACKGROUND

1. Technical Field

The field relates to geographical information systems.

2. Background

Geographic Information Systems (GIS) capture, store, manage and display data elements according to geospatial coordinates. For example, a Google Earth™ application renders satellite imagery, terrain, vectors and other data over a three-dimensional geometry representing the Earth's surface. Other GIS applications, such as a Google Street View application, provide the experience of exploring a city with panoramic views while navigating along a street.

Advertisements for local businesses may be displayed within 3D geographic environments such as a Google Earth™ application and a Google Street View application. Existing techniques for displaying advertisements include flat markers or icons that convey little information and virtual rectangular billboards applied to a flat surface.

These rectangular billboards have a number of problems. A billboard applied to a flat surface such as a storefront may hide part of the storefront. Rectangular billboards are also distorted when viewed from certain viewpoints. Imagine three adjacent stores "A", "B" and "C" with rectangular billboards on their storefronts. From a street viewpoint in front of "A", the "A" billboard will be relatively square, but the "B" and "C" billboards will be distorted because of their perspectives. Floating billboards have been tried but these are too intrusive to the user experience and are strangely unrealistic when the user begins to navigate in the 3D space.

Figure 1:
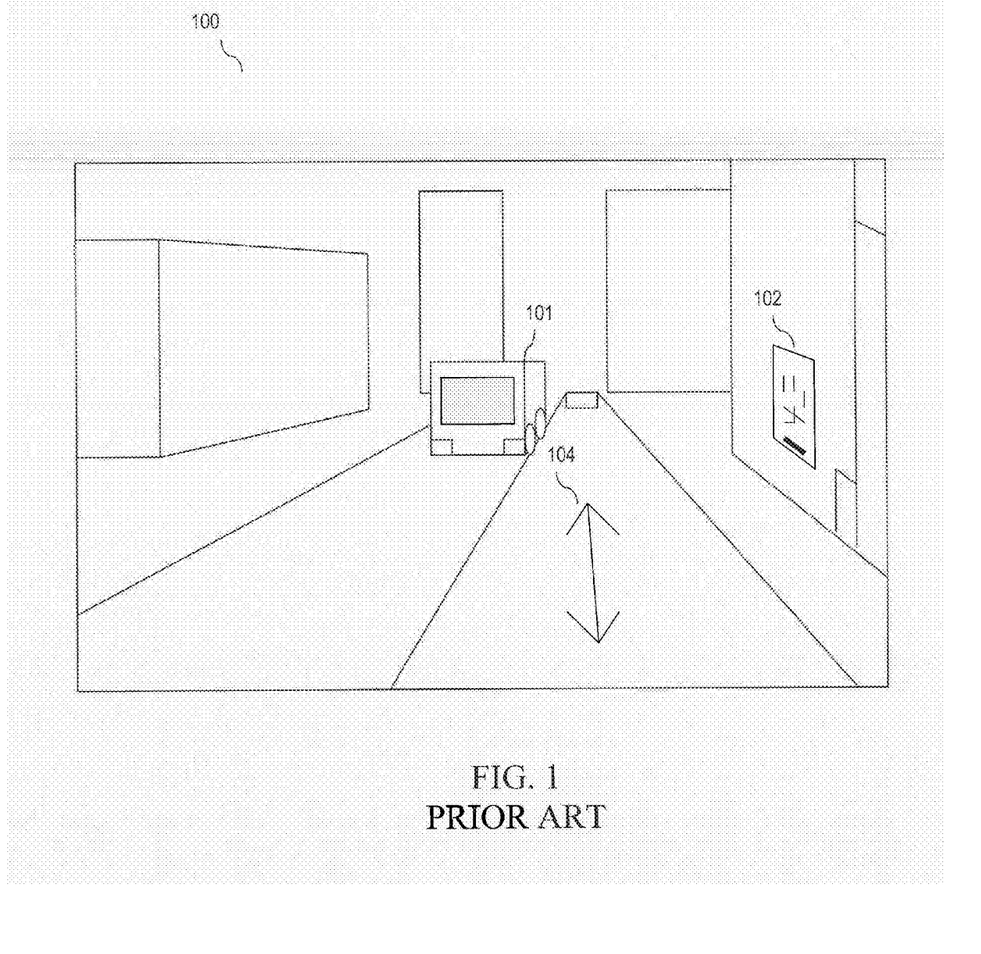
FIG. 1 is an example GIS view while navigating in a city.
Figure 2:
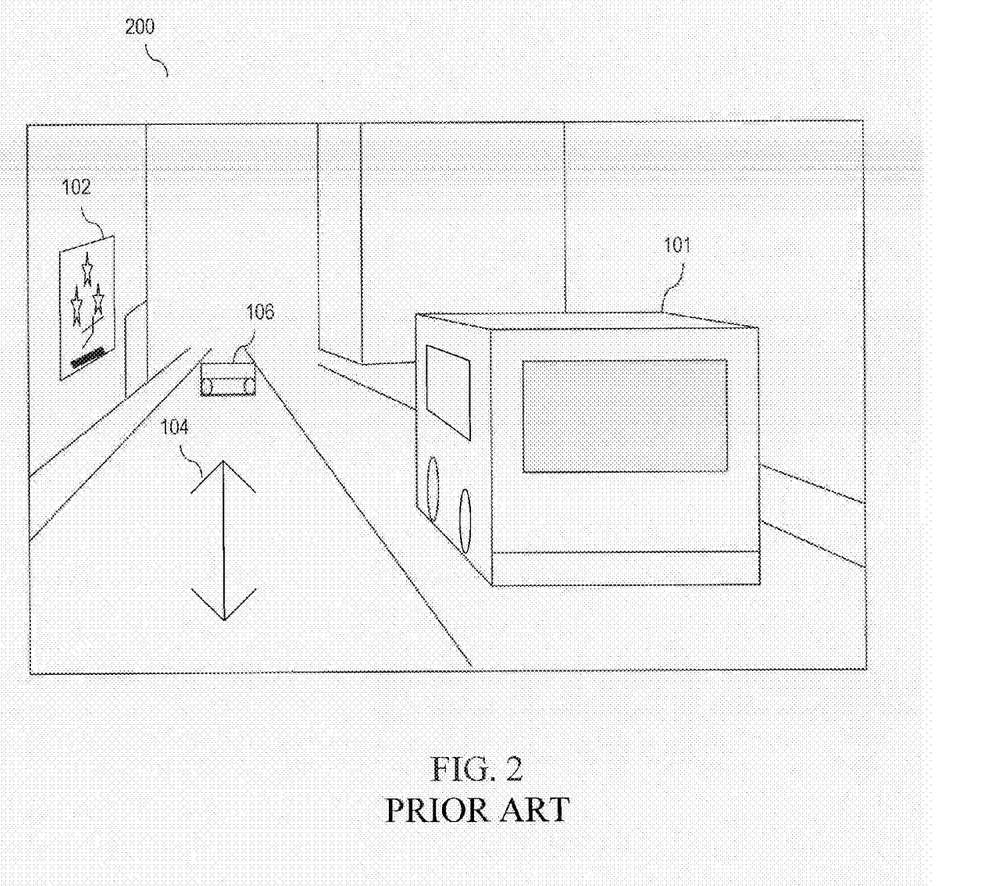
FIG. 2 is an example GIS view from the opposite direction after further navigation in the city.
Figure 3:
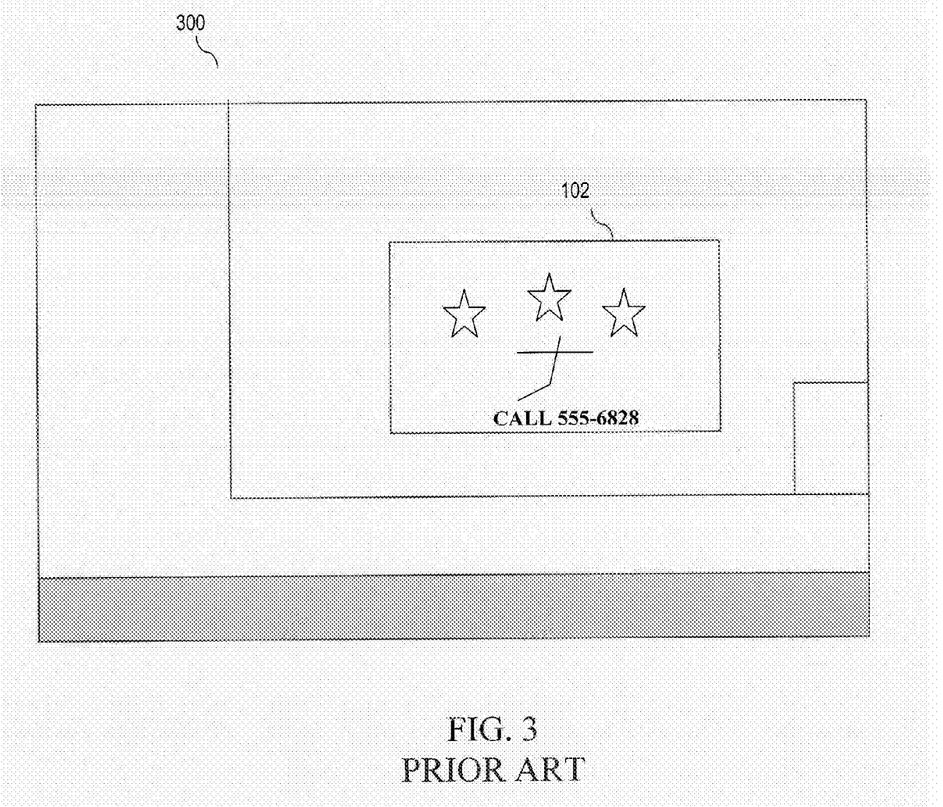
FIG. 3 is an example display view of a rectangular advertising billboard in a GIS view.

Some billboards may not be clearly displayed because available perspectives may be limited due to the nature of incremental navigation. For example, it may be impossible to stop in front of store "B" but one can stop in front of "C". Now the "C" billboard is readable, but the "B" billboard is never clearly seen. FIGS. 1-3 illustrate this problem. FIG. 1 shows an example GIS display view 100 of a city as viewed from a street. GIS view 100 includes buildings along either side of the street and traffic, such as an oncoming bus 101 in the opposing lane. Rectangular billboard 102 displays an advertisement that is not clearly visible from this perspective. A user may navigate to another incremental position within the GIS application using navigation control 104.

FIG. 2 shows another example GIS display view 200 from the perspective of the next incremental position within the GIS application. Display view 200 shows the street as viewed from the opposite direction. For instance, following car 106 is shown in the lane in the place of the previous viewpoint. Bus 101 in the other lane is now shown from behind. Rectangular billboard 102 is shown on the wall in the same geographical location. However, the incremental advancement did not place the user in front of the billboard, as would be shown in example GIS display view 300 of FIG. 3. Rather, the user advanced past the storefront with billboard 102, rendering billboard 102, distorted, out of view and ineffective.

BRIEF SUMMARY

Embodiments described herein refer to methods and systems for providing graphics, such as advertisements, in a three-dimensional (3D) geographical information system (GIS) view. According to an embodiment, a method for providing a graphic in a 3D GIS view may include obtaining a graphic and determining a 3D geographical space in the GIS view based on a geographical reference in the GIS view. The method may further include rendering a curvilinear representation of the graphic and displaying the curvilinear representation of the graphic in the geographical space. The method may also include adjusting the curvilinear representation of the graphic according to an updated viewpoint of the GIS view. The curvilinear representation may be oriented directly towards the updated viewpoint.

According to another embodiment, a system for providing a graphic in a 3D GIS view may include a geographical space manager configured to determine a 3D geographical space in the GIS view based on a geographical reference in the GIS view. The system may also include a graphic representation generator configured to obtain a graphic and render a curvilinear representation of the graphic. The system may further include a display module configured to display the curvilinear representation of the graphic in the geographical space on a display. The graphic representation generator may also be configured to adjust the curvilinear representation of the graphic according to an updated viewpoint of the GIS view. The curvilinear representation may be oriented directly towards the updated viewpoint.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

GIS applications, such as a Google Street View application, provide the experience of exploring a town or city with panoramic views while navigating along a street. Graphics, such as advertisements for local businesses, may be displayed within such 3D geographic environments. Existing techniques for displaying such graphics include flat markers that convey little information and virtual rectangular billboards applied to a flat surface. These rectangular billboards have a number of problems, as explained above with FIGS. 1-3.

Graphics, such as advertisements, may be displayed more effectively. Graphics may be presented in specific geographical locations without major distortions due to the perspective or viewpoint. Embodiments described herein relate to providing a graphic in a 3D GIS view, including curvilinear representations of the graphic.

Curvilinear representations may include cylindrical shapes, spheres, ellipsoids, spheroids and other shapes that curve around a surface so that the graphic is visible from most other or all available viewpoints. Other curvilinear representations may include convex or concave shapes. Curvilinear shapes make it possible for graphics to adjust to face the user perspective without distortion, or at least without significant distortion. Curvilinear representations of graphics may be displayed in certain locations relative to a specific geographical reference, such as a storefront. Spherical representations may be effective for perspectives involving changes in altitude.

Figure 4:
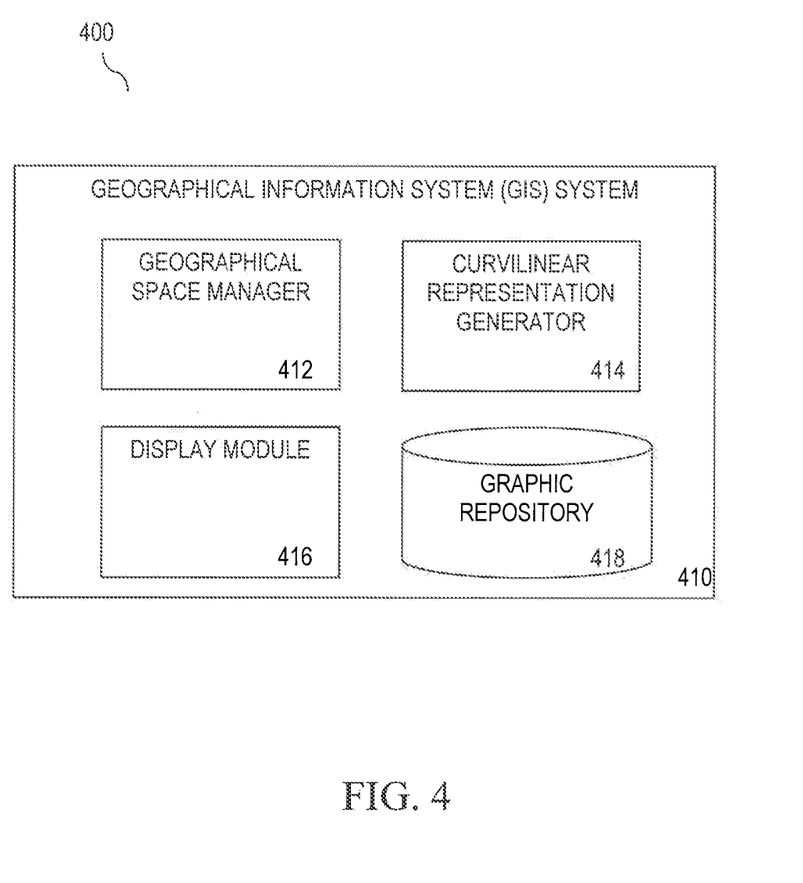
FIG. 4 is of diagram of a GIS system for providing a graphic in a 3D GIS view, according to an embodiment.

FIG. 4 shows an exemplary system 400 for providing a graphic in a geographical information system (GIS), according to an embodiment. System 400 includes GIS system 410. GIS system 410, or any combination of its components, may be part of or may be implemented with a computing device may be a processor-based computing device. In other cases, GIS system 410, or any combination of its components, may be software executed on a processor-based computing device. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments may be software executed by a processor, firmware, hardware or any combination thereof in a computing device.

GIS system 410 may be used to provide graphics in a 3D GIS view, according to an embodiment. GIS system 410 may use graphics software or data that renders or serves high resolution images, such as in a geographical information system (GIS). These software applications may be displayed in a user interface served to and displayed in a GIS view on a user interface on a server or client computer. The user interface may be served through a web-based application that is executed on a computing device. Web-based applications may include web browsers. Web-based applications may also include thin client applications that retrieve content from and provide content to a GIS server.

According to an embodiment, a user or administrator may select one or more geographical regions of the Earth, such as a street address in a city. The user interface may provide a number of tools that allow a user to spin around and navigate a virtual display of the city from the specified street location. For example, the user interface may be a Google Maps or Street View interface.

GIS system 410 may include geographical space manager 412, curvilinear representation generator 414 and display module 416. In a further embodiment, GIS system 410 may include graphic repository 418 for storing graphics and information associated with the graphics. For example, graphic repository 418 may store graphics obtained from customers and advertisers as well as various representations of the graphics. Graphic information may include when, where and how to display stored or received graphics.

According to an embodiment, geographical space manager 412 may be configured to determine a 3D geographical space in a GIS view based on a geographical reference in a GIS view. A geographical reference may be a residential or business location. A geographical reference may be just a certain portion of the location, such as a wall surface on the front of a store. Geographical references may be buildings, public areas, landmarks, addresses or any other geolocated structure or locations. Geographical references may also be defined by specific coordinates, such as latitude, longitude and altitude.

A geographical space may be any location on or around a geographical reference. For example, a geographical space may be a location on a sidewalk just outside of a storefront. The geographical space may be selected based on certain factors such as perspective, geographical reference size, advertising graphic size, time of day, cultural considerations, changes or proposed changes in the area, or various other factors. For example, geographical space manager 412 may determine the geographical space based on a size and location of the geographical reference in the GIS view. In other cases, the geographical space may also be determined based on an amount paid or a bid, according to a business model for advertising or displaying graphics in a GIS view.

According to an embodiment, curvilinear representation generator 414 may be configured to obtain a graphic and render a curvilinear representation of the graphic. The graphic may be an advertisement. The graphic may be static or dynamic information. The graphic may be an image or a video. In some cases, the graphic may be interactive. In some embodiments, a curvilinear representation of the graphic may be generated so that it is displayed in the same manner or proportions at different perspectives (in some cases, all available perspectives). Curvilinear representations may include any of the different shapes discussed above. Other shapes may include tires, beverage bottles or other curvilinear real world objects.

According to a further embodiment, the curvilinear representation may be rendered according to the GIS view. For example, drawing and texturing of the curvilinear representation may consider the pixels surrounding the geographical space. The graphic may be rendered as a texture map. In some embodiments, the curvilinear representation may be rendered and displayed to have a three-dimensional appearance, possibly for use with 3D glasses.

According to a further embodiment, the curvilinear representation may be rerendered based on a change in perspective to orient the graphical representation towards an updated GIS viewpoint. The orientation may be directly at the new viewpoint. This adjustment may be made in order to center or adjust the face towards the user at a new perspective of the graphic. It is possible that there will be no change in the visibility of the graphic and that no distortion would be added. This would be due to the curvilinear nature of the representation and the adjustment of the orientation. The curvilinear representation may also be rerendered. This adjustment is shown, for example, by FIGS. 5 and 6, where the adjustment of the curvilinear representation from the viewpoint of FIG. 5 to the viewpoint of FIG. 6 results in no added distortion or change in the proportion of the graphic.

Display module 416 may be configured to display the curvilinear representation of the graphic in a determined geographical space, according to an embodiment. This may be displayed in a GIS view on a display of computing device.

Figure 5:
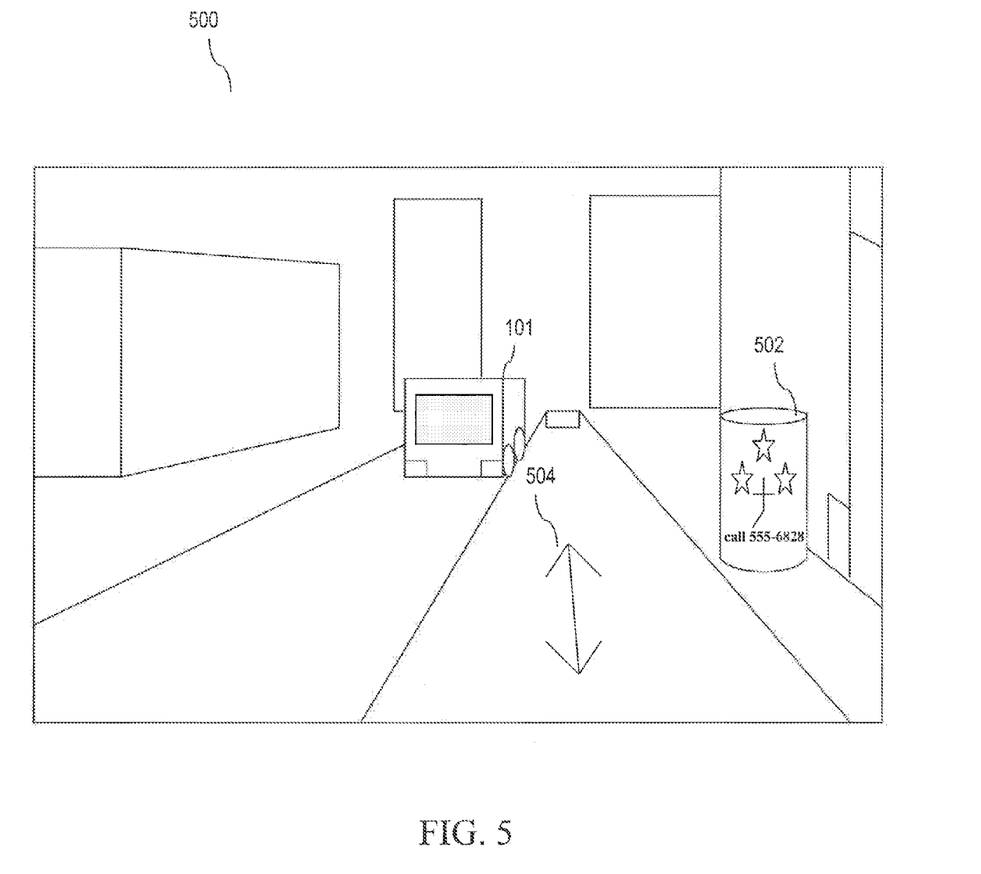
FIG. 5 is an example GIS view showing a curvilinear representation of a graphic, according to an embodiment.

In a street level 3D view, a curvilinear representation addresses the billboard difficulties described in the problem statement above. FIG. 5 shows an example GIS display view 500, according to an embodiment. GIS view 500 shows the same GIS view as GIS view 100 of FIG. 1, except that billboard 102 of GIS view 100 has been replaced with curvilinear representation 502 of the graphic. In this example, curvilinear representation 502 is a cylindrical shape. Curvilinear representation 502 can be located in front of the business, literally on the sidewalk, and thus fits more naturally into the virtual world, even while affording added prominence without being intrusive. In some cases, curvilinear representation 502 may be rendered so as to appear as a live object that was imaged with the panoramic views. The texture, lighting, shading and other characteristics of its appearance may be adjusted to blend into the panoramic views. For example, a curvilinear representation may take on the appearance of a street kiosk that was captured in a panoramic image.

Figure 6:
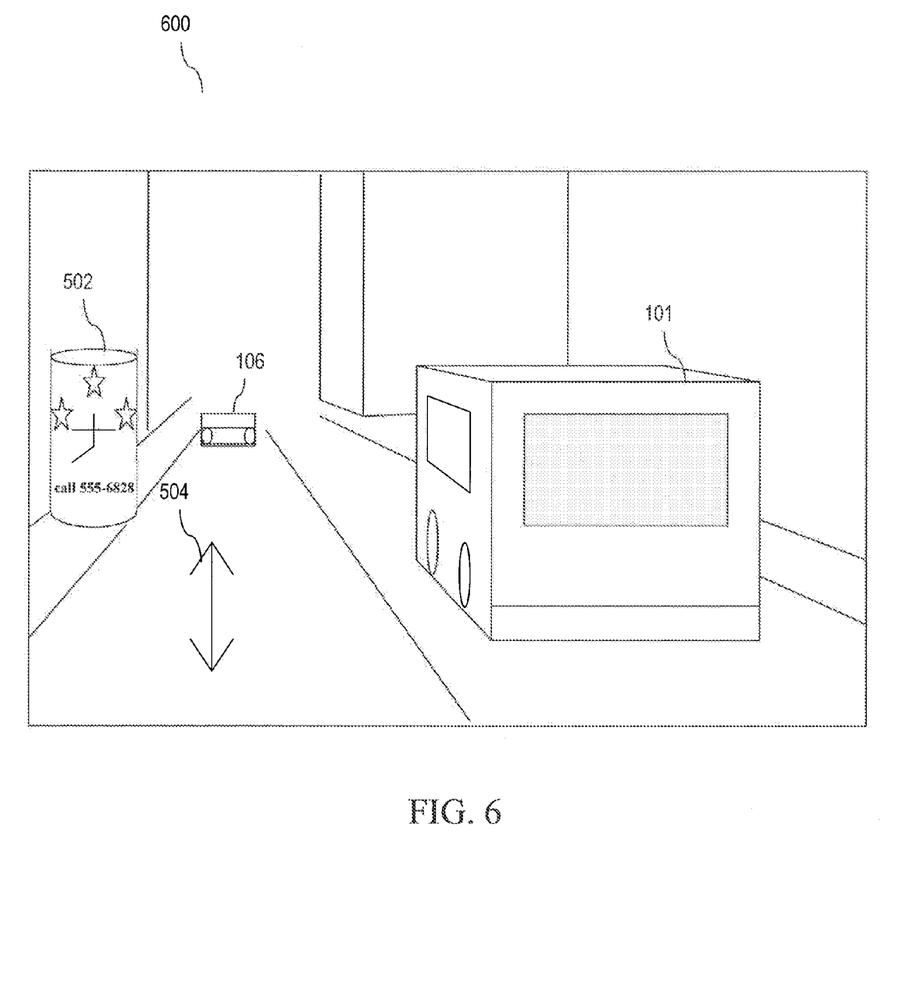
FIG. 6 is an example GIS view showing a curvilinear representation of a graphic from another viewpoint, according to an embodiment.

In contrast to rectangular representations, a curvilinear shape, such as a cylinder, presents a uniform shape when viewed from any direction at street level and thus can be better suited for displaying certain types of information. As the observer moves, the content could be made to rotate on the surface of the cylinder so that it always faces the observer. For example, FIG. 6 shows example GIS display view 600, which is the same incremental position view as FIG. 2. This GIS view is an updated viewpoint. In GIS view 600, curvilinear representation 502 shows the graphic in basically the same way (proportion, size and detail) as from the earlier perspective in GIS view 500. The graphical representation is directly oriented towards the new viewpoint. Since the graphic may be displayed from different perspectives without distortion, it should be less intrusive than rotating, a rectangular billboard. Optionally, the content could rotate on the surface of the cylinder independent of the observer position, giving various effects such as a scrolling marquee, a slideshow or a simple "barber pole" The cylinders themselves may have recognizable iconic value and could replace other marker types, e.g., commonly used red/black lettered icons, if desired. In some cases, even though the distortion or proportions are relatively the same, the size may be adjusted based on a distance of the viewpoint from the geographical space. If there are significant differences in distance, some reproportioning may be necessary.

In a further embodiment, a curvilinear representation of a graphic may be responsive to user interaction or the position of the cursor relative to the representation. The graphic may blend into the panoramic view, have less color or have more transparency. Upon a user interaction, movement, viewpoint, field of view or cursor position, the curvilinear representation of the graphic may change its appearance, color, transparency, size, position, shape or other characteristics. In some cases, a level of detail may change or adjust based on a distance, viewpoint or field of view. For example, hypertext links, send-to-phone, driving directions, etc. may not be displayed until a more detailed representation of the graphic is displayed. In another example, a cursor click or hover on a representation may make the representation larger or change shape in order to fully display a graphic.

Figure 7A:
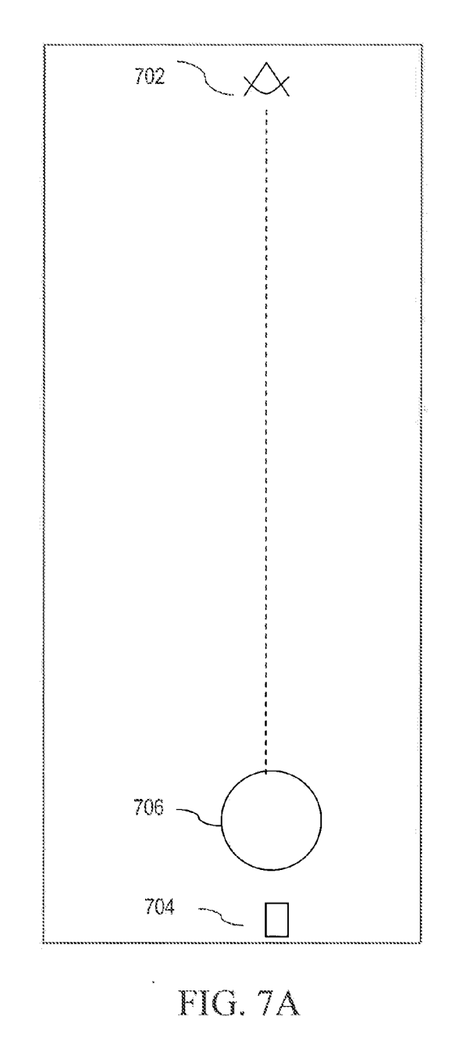
FIGS. 7A-7C are diagrams showing adjustments to a curvilinear representation of a graphic, according to an embodiment.

When a viewpoint involves a birds-eye or oblique view, a spherical representation may be used instead of a cylinder, thus giving the same shape and graphical display from all directions and altitudes. A spherical representation is shown as representations 706, 708 and 710 in FIGS. 7A-7C, according to embodiments. In some cases, curvilinear representation generator 414 may determine a size of the curvilinear representation of the graphic based on a field of view of the GIS view and a distance from the GIS viewpoint to the geographical reference. For example, FIG. 7A shows a viewpoint 702 that is a great distance from a geographical reference, building 704. At this altitude from the ground, a graphical representation needs to be larger to be legible. Therefore, representation 706 is quite large compared to building 704. A graphic representation may also be on a roof of a structure.

Figure 7B:
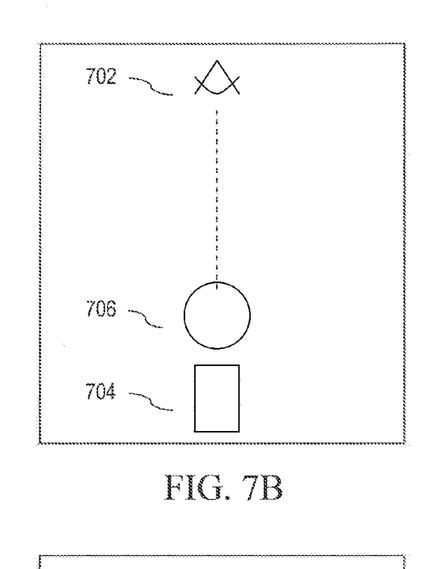
Figure 7C:
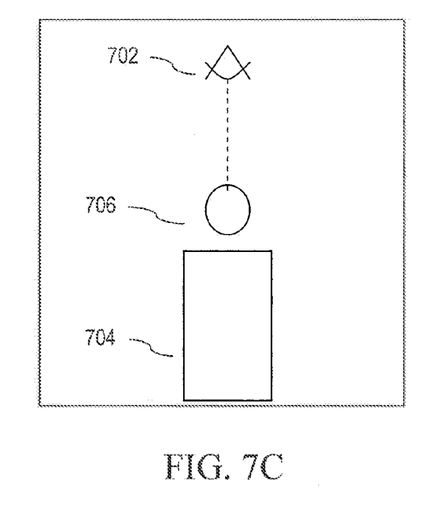

FIG. 7B shows viewpoint 702 from a lower altitude. Representation 706 is adjusted in size and placement in relation to building 704. Here, representation 706 appears about the same size as building 704. In FIG. 7C, viewpoint 702 is much closer to building 704. Representation 706 is now smaller than building 704.

Figure 8A:
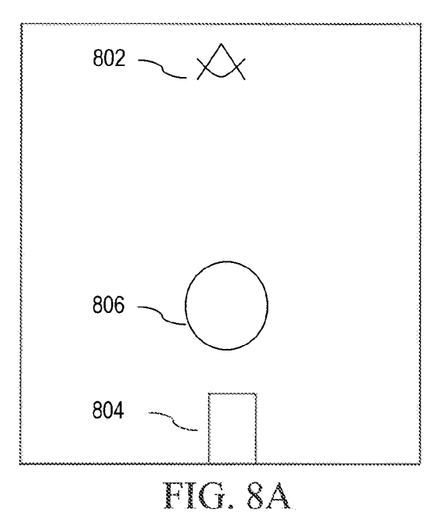
FIGS. 8A-8D are diagrams showing adjustments to a size, shape and position of a curvilinear representation of a graphic, according to an embodiment.
Figure 8B:
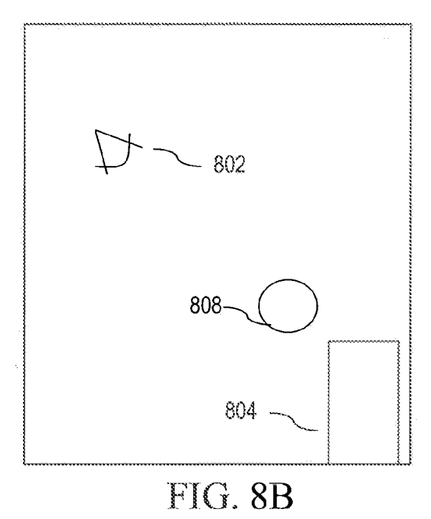
Figure 8C:
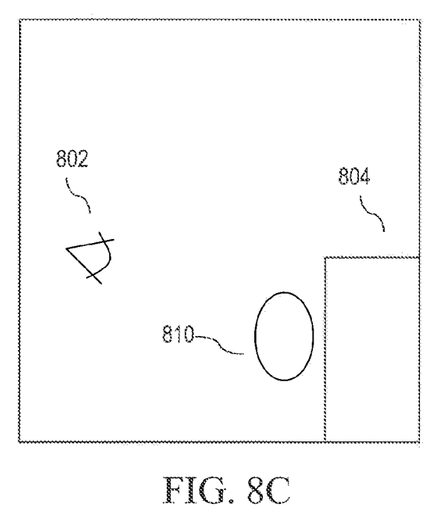
Figure 8D:
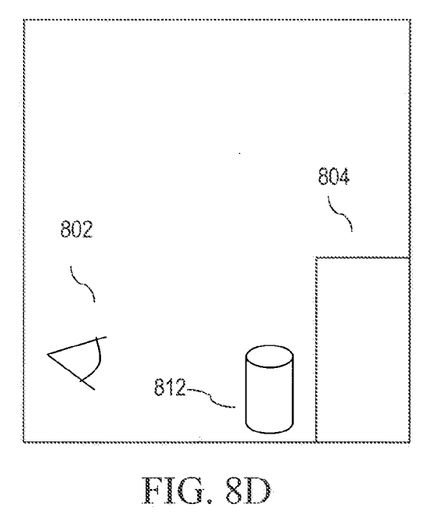

When adjusting altitude, a curvilinear representation of a graphic may adjust its geographical space relative to an associated geographical representation, according to an embodiment. FIGS. 8A-8D show an example of a curvilinear representation 806 adjust its size, position and shape as viewpoint 802 changes. In FIG. 8A, viewpoint 802 is directly above building 804, which is a graphical representation associated with the curvilinear representation 806. Representation 806 is a large sphere above building 804. As the altitude of viewpoint 802 drops in FIG. 8B and descends to a position more in front of building 804, the size of representation 808 changes. The geographical space of representation 808 also changes in position relative to building 804. Representation 808 also becomes more ellipsoidal. In FIG. 8C, representation 810 is more elongated and appears in front of building 804. By FIG. 8D, representation 812 is now cylindrical and at street level in front of building 804.

Figure 9A:
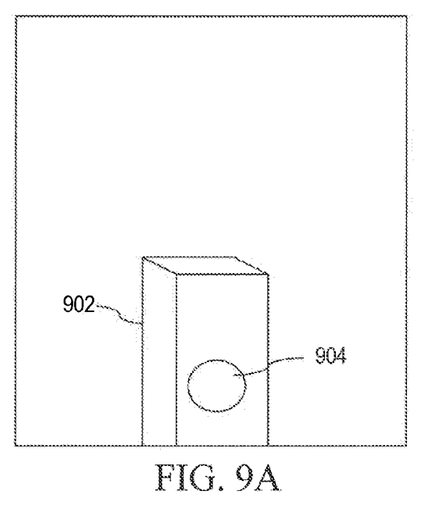
FIGS. 9A-9D are diagrams showing adjustments to a position of a curvilinear representation of a graphic, according to an embodiment.
Figure 9B:
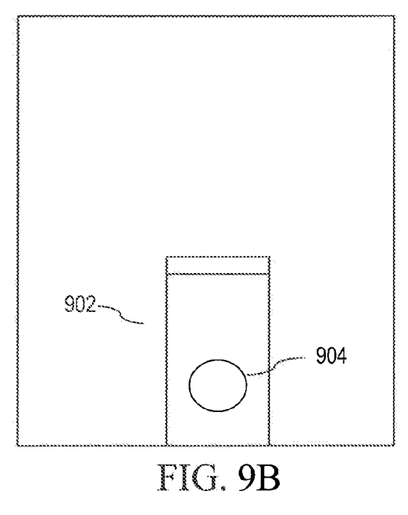
Figure 9C:
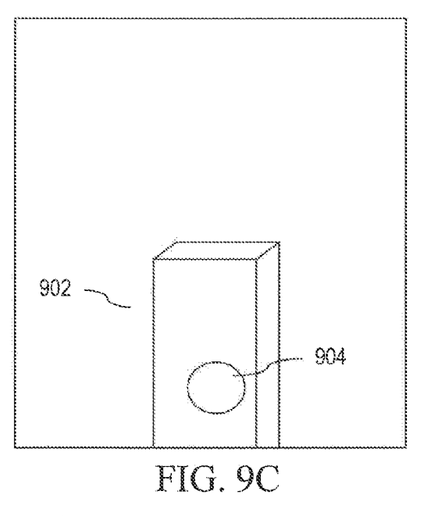
Figure 9D:
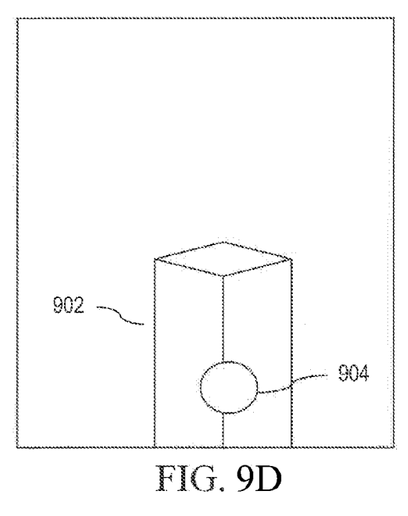

Another example of a geographical space adjusting its position relative to a viewpoint and/or GIS field of view is shown in FIGS. 9A-9D. In FIG. 9A, curvilinear representation 904 is a spheroid in front of geographical reference building 902. As the viewpoint rotates around building 902, curvilinear representation 904 rotates around to keep up with the changing perspective in order to display the graphic during this change in perspective. FIGS. 9C and 9D further illustrate this adjustment. This helps to avoid occlusion caused by the geographical reference or surrounding buildings, structures or gaps in panoramic imaging.

According to embodiments, a rendering client (Google Earth, Google Maps, Google Street View) may issue a request to a server that includes viewport position information. The server may respond with various data which the client uses to render the scene, including some geolocated features within the viewport like businesses and points of interest. Part of the data tells the client how to render the geolocated features. Display module 416 may be configured to display a curvilinear representation of the graphic in a geographical space.

Figure 10:
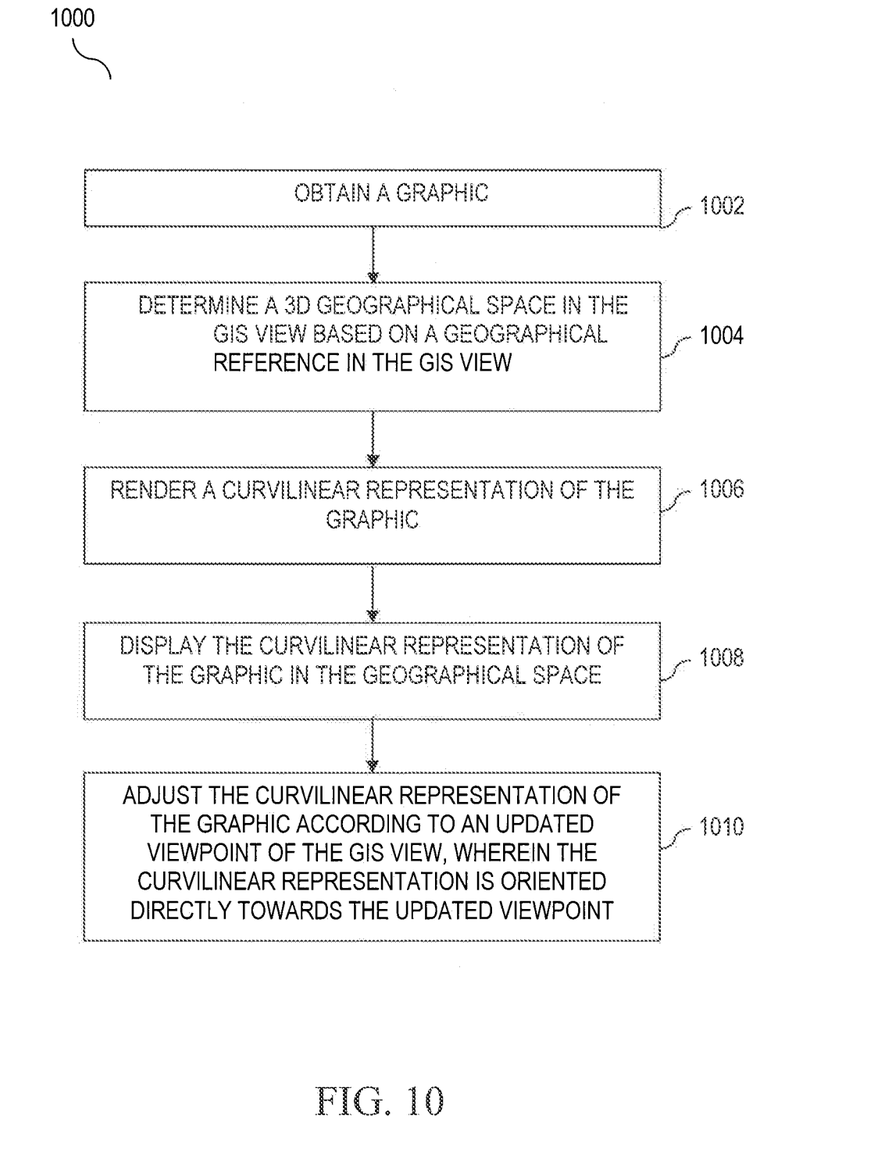
FIG. 10 is a flowchart showing a method for providing a graphic in a 3D GIS view, according to an embodiment.

FIG. 10 is a flowchart illustrating an exemplary method 1000 for providing a graphic in a geographical information system (GIS) view, according to an embodiment. In step 1002, a graphic is obtained. This graphic may be an advertisement or any other type of graphic explained above. In step 1004, a 3D geographical space in the GIS view is determined based on a geographical reference in the GIS view. This may take into account a number of factors relative to the GIS view. Other factors, such as revenue generation or financial considerations may be used to determine a geographical space.

In step 1006, a curvilinear representation of the graphic is rendered. In step 1008, the curvilinear representation of the graphic is displayed in the geographical space. The graphic may be placed in a GIS view, but not fully display a graphic until a user interacts with the geographical reference or geographical space.

In step 1010, the curvilinear representation of the graphic is adjusted according to an updated viewpoint of the GIS view. This updated viewpoint may result from a navigation or advancement through the GIS by a user. In some cases, the advancement is continuous. In other cases, the advancement may be incremental. The curvilinear representation may be oriented directly towards the updated viewpoint. Any reorientation and rerendering provides for the display of the graphic as viewed from the original viewpoint. Steps 1002-1010 may be performed with the components of GIS system 410.

Although aspects of the invention can be used for images and data related to geographical locations in a GIS, embodiments of the invention are not limited to geographical locations or buildings. Aspects of the invention can also be used as a means of storing, transferring and securing any file-based data in areas of manufacturing, engineering design, research, medicine, physics, biology, geology, astronomy, architecture, entertainment, sports, or any other field that involves imaging from various perspectives.

Aspects of the present invention, for exemplary systems 400-900 and/or method 1000 or any part(s) or function(s) thereof may be implemented using hardware, software, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following, claims and their equivalents.

What is claimed is:

1. A computer-implemented method for providing a graphic in a 3D geographical information system (GIS) view comprising:
   obtaining, with one or more computing devices, a graphic;
   determining, with the one or more computing devices, a 3D geographical space in the GIS view based on a geographical reference in the GIS view;
   rendering, using the one or more computing devices, a curvilinear representation of the graphic;
   providing for display on a display surface, with the one or more computing devices, the curvilinear representation of the graphic in the geographical space; and
   continually adjusting the curvilinear representation of the graphic according to an updated viewpoint of the GIS view, wherein the curvilinear representation is oriented directly towards the updated viewpoint, including adjusting a shape and a position of the curvilinear representation of the graphic relative to the geographical reference based on a change of the GIS viewpoint relative to the geographical reference, such that the curvilinear representation of the graphic appears to at least partially rotate on the display surface.

2. The method of claim 1, wherein the rendering a curvilinear representation includes rendering a cylindrical representation of the graphic.

3. The method of claim 1, wherein the rendering a curvilinear representation includes rendering a ellipsoidal representation of the graphic.

4. The method of claim 1, wherein the rendering a curvilinear representation includes rendering a spherical representation of the graphic.

5. The method of claim 1, wherein the rendering a curvilinear representation includes rendering a convex representation of the graphic.

6. The method of claim 1, wherein the rendering a curvilinear representation includes rendering a concave representation of the graphic.

7. The method of claim 1, wherein the graphic is displayed proportionally the same from any viewpoint in the GIS view.

8. The method of claim 1, wherein the determining includes determining the geographical space based on a size and location of the geographical reference in the GIS view.

9. The method of claim 1, further comprising determining a size of the curvilinear representation of the graphic based on a field of view of the GIS view and a distance from the GIS viewpoint to the geographical reference.

10. The method of claim 9, wherein the adjusting includes adjusting the size of the curvilinear representation of the graphic relative to the geographical reference based on a change in the GIS viewpoint.

11. The method of claim 1, further comprising determining a position of the curvilinear representation of the graphic relative to the geographical reference based on an angle of a GIS viewpoint and a distance from the GIS viewpoint to the geographical reference.

12. The method of claim 1, wherein the adjusting the shape includes converting a spherical shape to a cylindrical shape as the GIS viewpoint approaches the altitude of the geographical reference.

13. The method of claim 1, wherein the determining includes determining a level of detail for the graphic based on the position of the GIS viewpoint relative to the geographical reference.

14. The method of claim 1, wherein the rendering includes rendering the curvilinear representation of the graphic with texture and shading comparable to objects around the geographical space.

15. The method of claim 1, wherein the adjusting includes adjusting the display of the curvilinear representation of the graphic based on a position of a user cursor relative to the geographical space.

16. A system for providing a graphic in a 3D geographical information system (GIS) view comprising:

a geographical space manager, implemented on a computing device, configured to determine a 3D geographical space in the GIS view based on a geographical reference in the GIS view;

a graphic representation generator configured to obtain a graphic and render a curvilinear representation of the graphic; and a display module configured to display the curvilinear representation of the graphic in the geographical space on a display, wherein the graphic representation generator is further configured to continually adjust the curvilinear representation of the graphic according to an updated viewpoint of the GIS view, wherein the curvilinear representation is oriented directly towards the updated viewpoint, and adjust a shape and a position of the curvilinear representation of the graphic relative to the geographical reference based on a change of the GIS viewpoint relative to the geographical reference, such that the curvilinear representation of the graphic appears to at least partially rotate on the display.

17. The system of claim 16, wherein the graphic representation generator is further configured to render a cylindrical representation of the graphic.

18. The system of claim 16, wherein the graphic representation generator is further configured to render an ellipsoidal representation of the graphic.

19. The system of claim 16, wherein the graphic representation generator is further configured to render a spherical representation of the graphic.

20. The system of claim 16, wherein the graphic representation generator is further configured to render a convex representation of the graphic.

21. The system of claim 16, wherein the graphic representation generator is further configured to render a concave representation of the graphic.

22. The system of claim 16, wherein the graphic is displayed proportionally the same from any viewpoint in the GIS view.

23. The system of claim 16, wherein the geographical space manager is further configured to determine the geographical space based on a size and location of the geographical reference in the GIS view.

24. The system of claim 16, wherein the graphic representation generator is further configured to determine a size of the curvilinear representation of the graphic based on a field of view of the GIS view and a distance from the GIS viewpoint to the geographical reference.

25. The system of claim 24, wherein the graphic representation generator is further configured to adjust the size of the curvilinear representation of the graphic relative to the geographical reference based on a change in the GIS viewpoint.

26. The system of claim 16, wherein the geographical space manager is further configured to determine a position of the curvilinear representation of the graphic relative to the geographical reference based on an angle of a GIS viewpoint and a distance from the GIS viewpoint to the geographical reference.

27. The system of claim 16, wherein the graphic representation generator is further configured to convert a spherical shape to a cylindrical shape as the GIS viewpoint approaches the altitude of the geographical reference.

28. The system of claim 16, wherein the graphic representation generator is further configured to provide a level of detail for the graphic based on the position of the GIS viewpoint relative to the geographical reference.

29. The system of claim 16, wherein the display module is further configured to render the curvilinear representation of the graphic with texture and shading comparable to objects around the geographical space.

30. The system of claim 16, wherein the display module is further configured to adjust the display of the graphic based on a position of a user cursor relative to the geographical space.

31. A non-transitory computer-readable medium storing instructions executable by a processor for performing a method comprising:

obtaining a graphic;

determining a 3D geographical space in the GIS view based on a geographical reference in the GIS view;

rendering a curvilinear representation of the graphic;

providing for display on a display surface the curvilinear representation of the graphic in the geographical space; and continually adjusting the curvilinear representation of the graphic according to an updated viewpoint of the GIS view, wherein the curvilinear representation is oriented directly towards the updated viewpoint, including adjusting a shape and a position of the curvilinear representation of the graphic relative to the geographical reference based on a change of the GIS viewpoint relative to the geographical reference, such that the curvilinear representation of the graphic appears to at least partially rotate on the display surface.

* * * * *